(12) United States Patent
Wong et al.

(10) Patent No.: US 7,383,334 B2
(45) Date of Patent: Jun. 3, 2008

(54) COMPARISON OF WEBSITE VISITATION DATA SETS GENERATED FROM USING DIFFERENT NAVIGATION TOOLS

(75) Inventors: Catherine Jen Wong, Provo, UT (US); Christopher Reid Error, Orem, UT (US); Brett Michael Error, Orem, UT (US)

(73) Assignee: Omniture, Inc., Orem, UT (US)

( * ) Notice: Subject to any disclaimer, the term of this patent is extended or adjusted under 35 U.S.C. 154(b) by 0 days.

(21) Appl. No.: 11/458,306

(22) Filed: Jul. 18, 2006

(65) Prior Publication Data

US 2007/0100992 A1    May 3, 2007

Related U.S. Application Data

(60) Provisional application No. 60/731,398, filed on Oct. 28, 2005.

(51) Int. Cl.
*G06F 15/173* (2006.01)
*G06F 7/00* (2006.01)
*G06F 11/00* (2006.01)

(52) U.S. Cl. ............... 709/224; 709/223; 370/229; 707/100

(58) Field of Classification Search ............ None
See application file for complete search history.

(56) References Cited

U.S. PATENT DOCUMENTS

| | | |
|---|---|---|
| 5,760,772 A | 6/1998 | Austin |
| 5,796,402 A | 8/1998 | Ellison-Taylor |
| 5,821,931 A | 10/1998 | Berquist et al. |
| 5,835,087 A | 11/1998 | Herz et al. |
| 5,870,559 A | 2/1999 | Leshem et al. |
| 5,966,139 A | 10/1999 | Anupam et al. |
| 6,008,809 A | 12/1999 | Brooks |
| 6,026,397 A | 2/2000 | Sheppard |
| 6,182,097 B1 | 1/2001 | Hansen et al. |
| 6,188,405 B1 | 2/2001 | Czerwinski et al. |
| 6,266,649 B1 | 7/2001 | Linden et al. |
| 6,310,631 B1 | 10/2001 | Cecco et al. |
| 6,393,479 B1 | 5/2002 | Glommen et al. |

(Continued)

FOREIGN PATENT DOCUMENTS

WO    WO 00/58866    10/2000

(Continued)

OTHER PUBLICATIONS

Notification of International Search Report and Written Opinion, PCT/US04/06898, Feb. 9, 2005, 8 pages.

(Continued)

*Primary Examiner*—Wen-Tai Lin
(74) *Attorney, Agent, or Firm*—Fenwick & West LLP

(57) ABSTRACT

A system compares website visitation data sets in response to receiving user input. The system includes a client for processing the input to define one or more data sets as a query to a network, which returns the requested data. The system calculates, for at least one website visitation metric, a difference between values of the website visitation metric for the data sets, and displays one or more reports. In addition, reports can be further adjusted per additional data input. The results enable users to analyze the effects of combinations of factors.

30 Claims, 11 Drawing Sheets

U.S. PATENT DOCUMENTS

| | | | |
|---|---|---|---|
| 6,414,677 B1 | 7/2002 | Robertson et al. | |
| 6,473,102 B1 | 10/2002 | Rodden et al. | |
| 6,489,968 B1 | 12/2002 | Ortega et al. | |
| 6,654,036 B1 | 11/2003 | Jones | |
| 6,671,711 B1 | 12/2003 | Pirolli et al. | |
| 6,704,016 B1 | 3/2004 | Oliver et al. | |
| 6,754,873 B1 | 6/2004 | Law et al. | |
| 6,766,370 B2 | 7/2004 | Glommen et al. | |
| 6,850,988 B1 | 2/2005 | Reed | |
| 6,862,574 B1 | 3/2005 | Srikant et al. | |
| 6,950,993 B2 | 9/2005 | Breinberg | |
| 6,963,874 B2 | 11/2005 | Kasriel et al. | |
| 6,968,511 B1 | 11/2005 | Robertson et al. | |
| 6,980,962 B1 | 12/2005 | Arganbright et al. | |
| 7,085,682 B1 | 8/2006 | Heller et al. | |
| 2002/0040395 A1 | 4/2002 | Davis et al. | |
| 2002/0042750 A1 | 4/2002 | Morrison | |
| 2002/0087621 A1 | 7/2002 | Hendriks | |
| 2002/0091591 A1 | 7/2002 | Tsumura et al. | |
| 2002/0093529 A1 | 7/2002 | Daoud et al. | |
| 2002/0099812 A1 | 7/2002 | Davis et al. | |
| 2002/0147805 A1* | 10/2002 | Leshem et al. | 709/223 |
| 2002/0152284 A1 | 10/2002 | Cambray et al. | |
| 2002/0165936 A1 | 11/2002 | Alston et al. | |
| 2002/0178169 A1* | 11/2002 | Nair et al. | 707/100 |
| 2002/0186237 A1 | 12/2002 | Bradley et al. | |
| 2002/0186253 A1 | 12/2002 | Rodden et al. | |
| 2002/0198939 A1 | 12/2002 | Lee et al. | |
| 2003/0023712 A1 | 1/2003 | Zhao et al. | |
| 2003/0025737 A1 | 2/2003 | Breinberg | |
| 2003/0033405 A1* | 2/2003 | Perdon et al. | 709/224 |
| 2003/0055883 A1 | 3/2003 | Wiles, Jr. | |
| 2003/0128231 A1 | 7/2003 | Kasriel et al. | |
| 2003/0131097 A1 | 7/2003 | Kasriel et al. | |
| 2004/0049417 A1 | 3/2004 | Nickerson et al. | |
| 2004/0059746 A1 | 3/2004 | Error et al. | |
| 2004/0133671 A1 | 7/2004 | Taniguchi | |
| 2004/0174397 A1 | 9/2004 | Cereghini et al. | |
| 2004/0190448 A1* | 9/2004 | Fishteyn et al. | 370/229 |
| 2004/0205157 A1 | 10/2004 | Bibelnieks et al. | |
| 2005/0015376 A1* | 1/2005 | Fraser et al. | 707/10 |
| 2005/0044508 A1 | 2/2005 | Stockton | |
| 2005/0204307 A1 | 9/2005 | Nadal | |
| 2005/0229110 A1 | 10/2005 | Gegner et al. | |
| 2005/0235222 A1 | 10/2005 | Barbanson et al. | |
| 2005/0273727 A1 | 12/2005 | Barbanson et al. | |
| 2006/0212459 A1* | 9/2006 | Sugimura | 707/100 |

FOREIGN PATENT DOCUMENTS

| | | | |
|---|---|---|---|
| WO | WO 02/23438 A2 | 3/2002 | |

OTHER PUBLICATIONS

Notification of International Search Report and Written Opinion, PCT/US04/06696, Feb. 28, 2005, 9 pages.

International Search Report and Written Opinion, PCT/US06/41892, Jun. 21, 2007, 12 pages.

U.S. Appl. No. 10/113,808, filed Mar. 29, 2002, Wiles, Jr.

U.S. Appl. No. 10/113,322, filed Mar. 29, 2002, Zhao et al.

U.S. Appl. No. 10/057,513, filed Jan. 25, 2002, Alston et al.

U.S. Appl. No. 09/835,112, filed Apr. 13, 2001 Cambray et al.

Hong, J. et al., "WebQuilt: A Framework for Capturing and Visualizing the Web Experience", WebQuilt, homepage: http://guir.berkeley.edu/projects/webquilt/, May 1-5, 2001, pp. 1-8.

Notification of International Search Report and Written Opinion, PCT/US04/39253, Dec. 13, 2005, 13 pages.

Supplementary European Search Report, EP 04717485, Nov. 7, 2006, 3 pages.

\* cited by examiner

Front-end servers    Back-end servers

FIG. 5B

COMPARISON OF WEBSITE VISITATION DATA SETS GENERATED FROM USING DIFFERENT NAVIGATION TOOLS

RELATED APPLICATIONS

This application claims priority under 35 U.S.C. §119 from U.S. Provisional Application Ser. No. 60/731,398, filed Oct. 28, 2005 by Catherine Jen Wong et al., entitled "A/B Comparison and Lock Method," and is related to U.S. patent application Ser. No. 11/313,588, filed Dec. 20, 2005 by Brett M. Error, entitled "Incrementally Adding Segmentation Criteria to a Data Set," each incorporated herein by reference.

FIELD OF THE INVENTION

The present invention relates generally to website usage tracking, and more specifically to improved techniques for comparing sets of website visitation data.

BACKGROUND

Website providers often wish to collect data that describes usage and visitation patterns for their websites and for individual web pages within the sites. Such information can be extremely valuable in developing usage statistics for various purposes, including for example estimating server load, determining advertising rates, identifying areas of websites that are in need of redesign, and the like.

Such information is useful in many ways, including for example collecting feedback that leads to improved web page design, determining the effect of various degrees of prominence of links and graphic elements on web pages, and determining the contribution of individual links to an eventual sale.

Users, such as website administrators, often wish to compare data sets in various ways. They also often want to filter and aggregate the results. However, existing reporting systems do not allow the user to easily compare, customize, and/or filter results. Thus, much of the business utility of tracking website visitor/customer visitation data is lost using existing systems. Therefore, what is needed is an improved format that allows an easy comparison that visually depicts web page element usage and valuation statistics.

SUMMARY

The present invention provides a fast, responsive way for users to perform advanced analysis on data via a graphical user interface. Users can compare data sets and to each other and easily click on any data item to filter the result set of all reports by that item. Users also can launch various prepackaged reports onto a single workspace. The results of the comparison and filtering are shown in one or more reports, enabling users to analyze the effects of combinations of factors. In addition, this aspect of the present invention is advantageous because the results can be returned almost instantaneously.

The present invention includes a user interface that receives user input to compare two or more data sets of website visitation data. In addition, input is received to define both data sets and adjust filtering criteria for the associated reports. The system retrieves data corresponding to the defined and/or adjusted data set(s), and calculates, for at least one website visitation metric, the difference between values of the website visitation metric for the data sets. Then, one or more reports are displayed reflecting the data and the calculated difference.

In addition, while viewing one or more reports, the user can click on additional filter criteria. Following selection of compare mode or running reports, the display is updated so that it includes only report data that fit the specified criteria. Thus, the user can select various reports, compare data in the reports, add filter criteria, and quickly see the resulting changes in the output.

These aspects of the present invention provide greater visibility of the information generated by the above-described methods, providing the website owner valuable insight into which elements of a website are contributing to the success of the site and contributing to return on investment.

The description in the specification is not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 5B illustrates the user interface of FIG. 5A, to which an additional segment filter has been added.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The following description sets forth an embodiment wherein the invention takes place in the context of reporting of website visitation data gathered in the course of an online purchase. However, the description is merely illustrative of the techniques of the invention; one skilled in the art will recognize that the techniques of the invention can be applied in any context wherein it is desirable to filter website visitation data.

In the course of purchasing an item from an online retailer, a visitor/customer generally follows a basic path. The visitor enters a website (by, for example, typing the URL for the website, or selected from a Favorites menu, or clicking on a link) and is presented with a home page for the online retailer. During the process, the visitor generally is presented with an item description. If the visitor wants to buy the item, he or she clicks on an "Add to Cart" link and navigates to a Checkout page and then to a page for entering billing and shipping information. After entering such information, the visitor generally is presented with a confirmation page where he or she is given the opportunity to review the order and finalize it before exiting the website. Analysis of visitor navigation through such sequence is extremely valuable to website administrators.

Techniques for collecting site path sequences are known in the art. A particular visitor is recognized as he or she moves from page to page; the mechanics of visitor tracking are known in the art and need not be described in detail here. Visitor/customer web page visit records are stored in sequence according to they time that they occurred. Each visitation record typically contains two types of information: an identifier of the page visited, and metadata that provides further criteria for filtering and analyzing the sequential data.

It is within this context that the description of one embodiment present invention is described herein. In other embodiments, the present invention is used to analyze other data for which comparison between data sets is desired.

Figure 1:
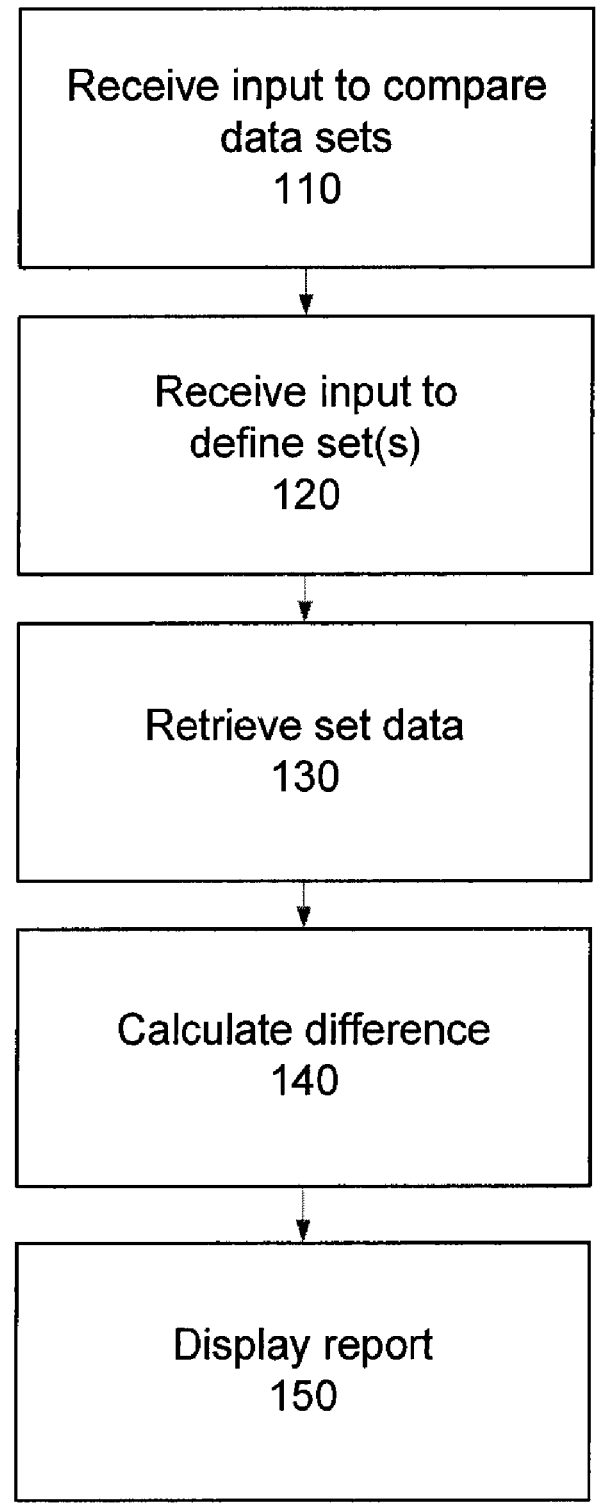
FIG. 1 is a flowchart illustrating a method for providing a comparison of website visitation data sets according to one embodiment of the present invention.

FIG. 1 is a flowchart illustrating a method for providing a comparison of website visitation data sets according to one embodiment of the present invention.

Figure 3A:
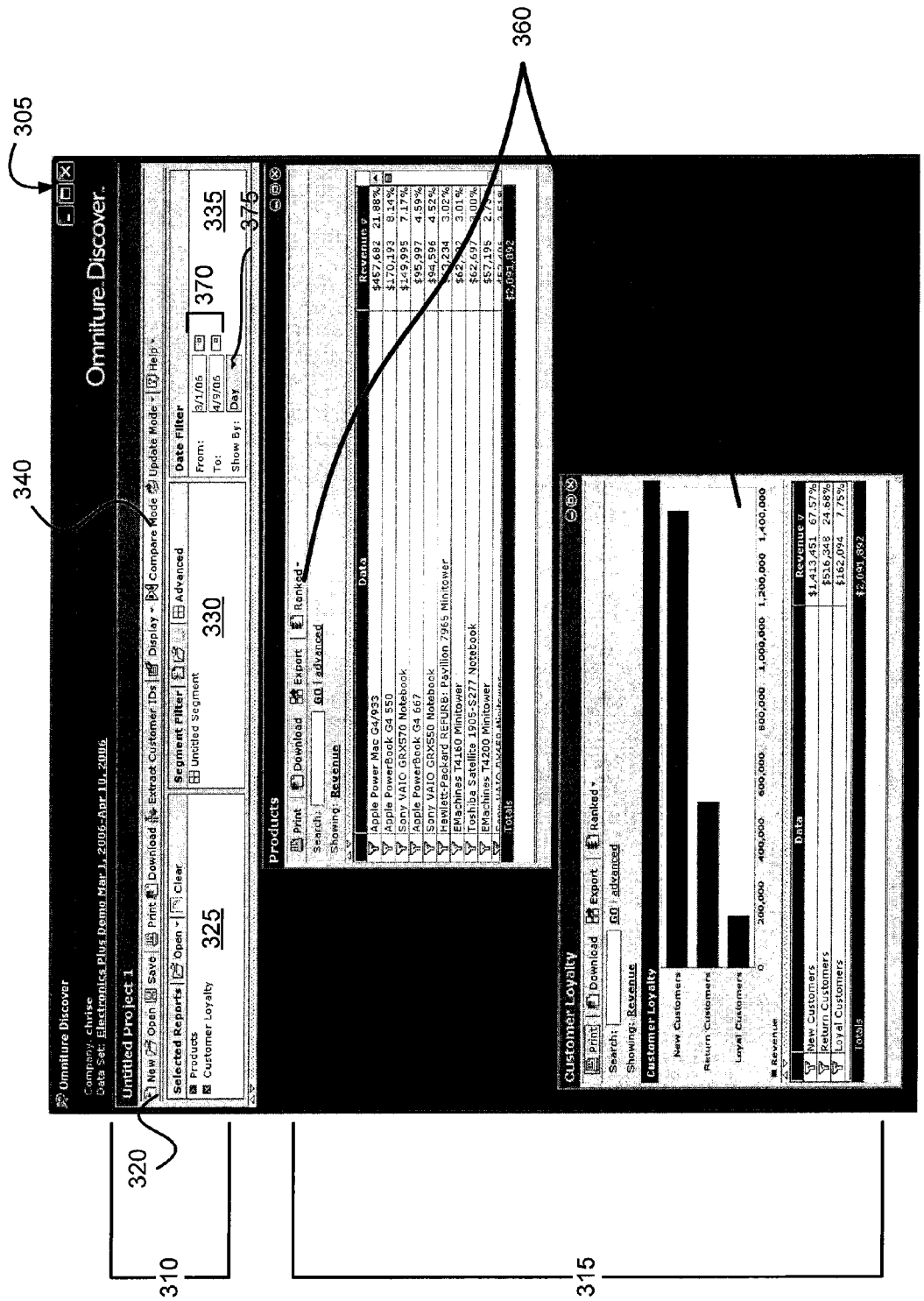
FIG. 3A illustrates a user interface for comparing website visitation data according to one embodiment of the present invention.

The process begins by receiving input to compare 110 website visitation data sets. In one embodiment, the user clicks on a compare mode button, e.g., 340 as shown in FIG. 3A. In this example, any reports displayed are automatically populated into the baseline segment 345 and baseline date areas 350, and will serve as the baseline for any adjustments to the segmentation 330 or date areas 335. In another embodiment, segment filters have been applied, and the input to compare data sets includes swapping previously baseline data for new baseline data, e.g., the baseline areas 345, 350 and segment and date areas 330, 335, may be swapped using button 505 as shown in FIG. 5.

Next, input is received 120 to define one or more website visitation data set(s). In one embodiment, the input includes application of segmentation and/or date filters, e.g., in segment filter area 330 and date filter area 335. In this example, the data in the baseline segment and baseline date filter areas 345, 350 are "locked" or otherwise not editable according to one embodiment, thus segment filters may be applied only to the segment filter 330 and date filter 335 areas.

In various embodiments, the input to define the one or more website visitation data sets may include includes adding segmentation criteria; removing pre-existing segmentation criteria; adjusting a date range; creating a new segmentation criterion; and/or activating a contextual menu of options for the segmentation criteria.

The user can define the one or more website visitation data sets by various means. For example, the user can click on an icon ("funnel") adjacent to the desired filter criterion. In one embodiment, clicking on a funnel icon causes the filter to be applied as an "OR Visits where [dimension]= [selected item]" parameter. In one embodiment, the user can shift-click to apply the filter as an "AND" criterion. In one embodiment, the user can right-click to see a menu of options for applying the filter. The icon acts as a toggle in one embodiment, switching between activating and deactivating the criterion depending on its current state.

According to one embodiment, elements of the displayed reports are themselves user input elements for specifying filters. Thus, the user can click on an area (such as a line) within a tabular report to apply a filter that corresponds to the data item being displayed in that area.

Further, the input received takes the form of switching the baseline segment and date filter area 345, 350 data and the segment and date filter area 330, 335 data according to one embodiment. In this example, the switch may take place in addition to adjusting segmentation criteria, and may occur before and/or after segmentation criteria are adjusted.

Next set data associated with the newly applied filter(s) is retrieved 130. In one embodiment, this is accomplished by sending report queries and baseline data and receiving report data corresponding to the queries and baselines. In one embodiment, the data is sent to and received from to a network. In another embodiment, the data is sent to and received from a local machine. The reply is received, in one embodiment, with data. In this embodiment the retrieval includes interpreting the data. In one example hash codes stored, e.g., in local cache are used.

Then, the difference between the baseline data and newly-entered data is calculated 140 for at least one website visitation metric. In one embodiment, the calculation includes subtraction and calculation of percent change between the data sets.

Finally, one or more reports are displayed 150. In some embodiments, various views of the report data are available. For example, types of views include trended, improved, ranked, over time, fall-out, conversions, averages, graphical, Gantt, tabular, raw data, and flexible. Some reports also include a search field that allows the user to search for and view entries for specific keywords or phrases.

In one embodiment, the adjusted reports are displayed virtually instantaneously following the user input to compare data and/or adjust the segmentation criteria. In one embodiment, sampling rate for reports is selected based on requested date range, available RAM and other technological considerations.

In one embodiment, the above process is preceded by user input received to select one or more defined reports for viewing. In one embodiment, the user initiates this step by clicking on a user interface control such as a reports button.

Initially, reports, whether initial reports or reports adjusted by segmentation criteria or comparison mode, show a default number of data rows (such as 10), although the user can adjust the default number as desired. In various embodiments, the reports are standard, preset reports associated with a set of predefined filters; user-customized reports built during a current session; previously customized reports retrieved from storage; or fall-out reports.

A "fall-out report" is a report based, in one embodiment, on a target path specified in terms of checkpoints as described herein. A fall-out report indicates how many visitors continued to the next checkpoint in target path, regardless of whether the visitor/customer visited other, tangential pages before continuing.

One skilled in the art will recognize that the present invention can be used in connection with any type of filtering criteria that can be specified by the user, and/or with any combination of such filtering criteria. Examples include the ordinal visit number (indicating whether this is the visitor's first visit, second visit, etc.), which particular pages were visited, time of day of the visit, geographic location of the visitor, web browser being used, whether or not the visitor is using a beta version of the browser, and the like.

Figure 2A:
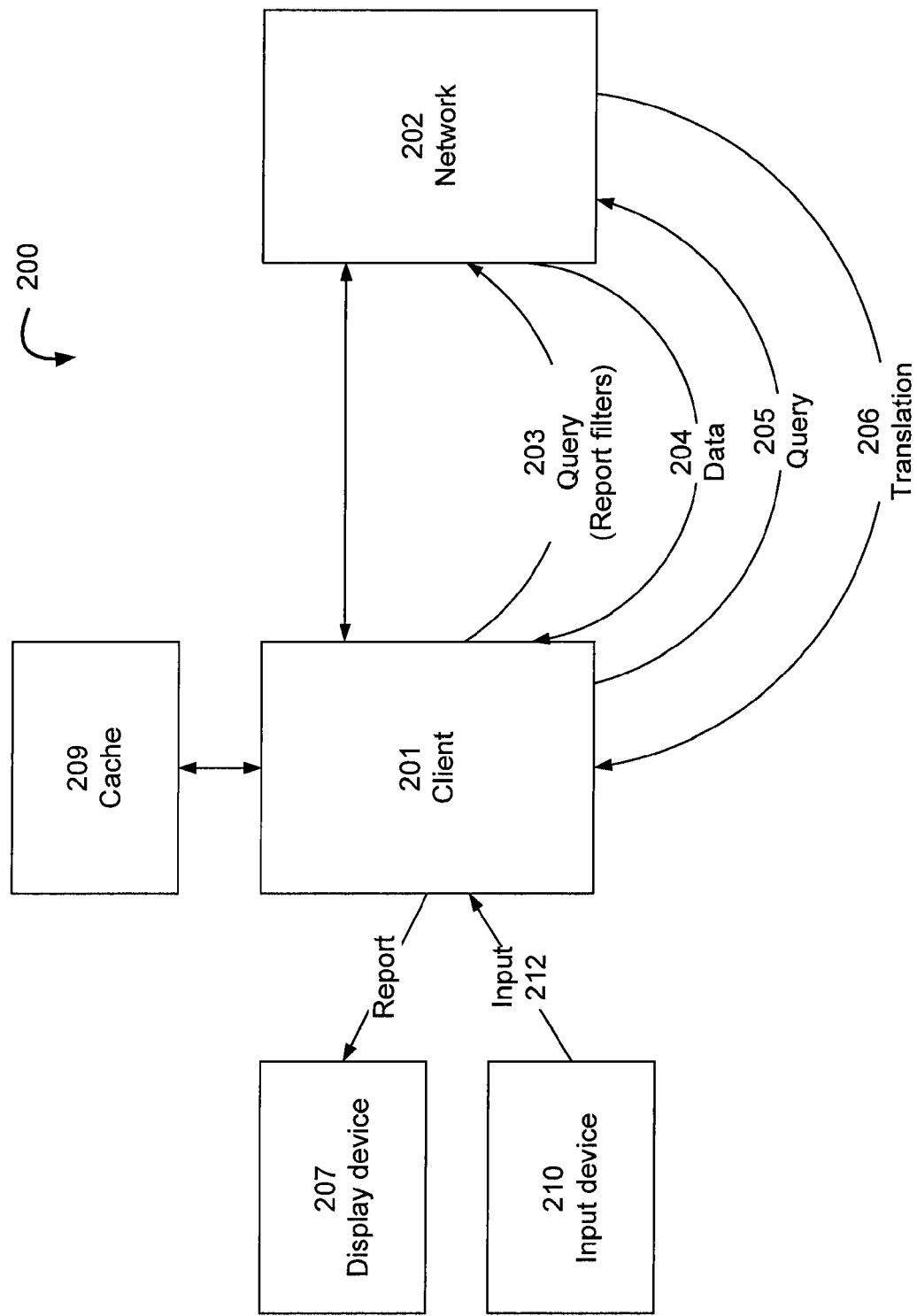
FIG. 2A is a block diagram illustrating a system useful for providing a comparison of website visitation data sets according to one embodiment of the present invention.

Referring now to FIG. 2A, there is shown an example of a system 200 useful for practicing the present invention according to one embodiment. One skilled in the art will recognize that the invention can be practiced using other embodiments that differ from the examples shown.

The system 200 includes a client 201, a network 202, and optionally a cache 209. The client 201 includes software including of a number of executable code portions and data files. These include code for viewing and interacting with website usage reports according to one embodiment of the present invention, as well as for supporting functionality of a user interface, as will be described in greater detail in conjunction with FIG. 2C.

Client 201 is responsible for orchestrating the processes performed according to the methods of the present invention. For example, client 201 receives input 212 from an input device, and sends reports to display 207 (or other output device) for output to the user. Client 201 runs on a standard personal computer.

Figure 2B:
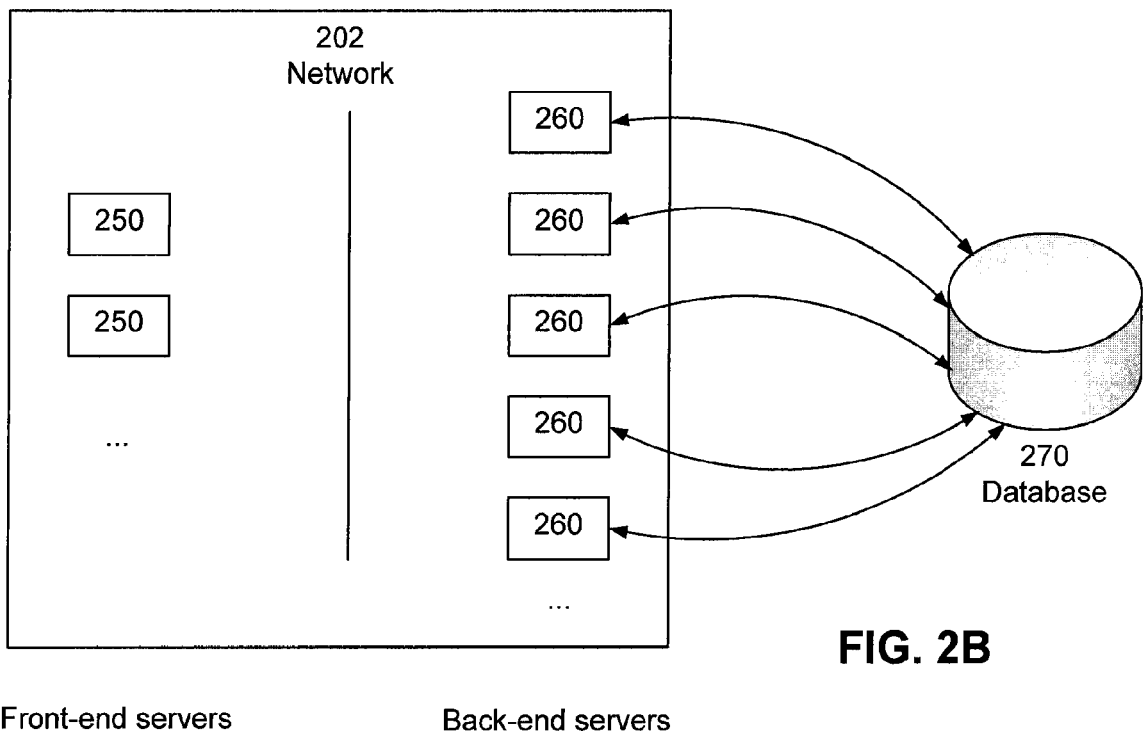
FIG. 2B is a block diagram illustrating an architecture for a network according to one embodiment of the present invention.

Network 202 is a centralized network for handling and responding to client requests for data on website usage, as described further in conjunction with FIG. 2B.

A cache 209, if present, is a standard cache of small, fast memory holding recently accessed data. The cache 209 may include, for example a list of hash codes or other look up tables for report data as described below.

In one embodiment, the components shown in FIG. 2A operate as follows. When a user requests one or more reports via an input device 210, client 201 receives input 212 to this effect. Client 201 sends a query 203 to network 202, specifying which reports are requested, and optionally specifying one or more filters or baselines for the reports. In one embodiment, query 203 is in XML format.

In response to query 203, network 202 returns data 204 that contains a representation of the report data. Data 204, in various embodiments, may be coded or not, and may be hashed data or may be included in a standard look up table. For example, data 204 may specify, in hash coded terms, the text string name of an item in a report. The data 204 is received by client 201.

Client 201 stores, in local cache 209 in one embodiment, a list of previously received and decoded hash codes or look up table information, so that it can correctly interpret a hash code or table data that it has encountered previously. In one embodiment, local cache 209 is used and is cleared at the end of a session, so that only those codes previously received in the same session are stored in cache 209. In other embodiments, local cache 209 is implemented in a more persistent or less persistent fashion, depending on user needs.

Upon receiving data 204, client 201 consults cache 209 if present; if cache 209 contains the hash code(s) or meanings of data 204 (in other words, if client 201 has previously received data containing the same hash code/meaning), client 201 can interpret the meaning of the hash-coded or look-up tabled data without any further communication with network 202. For example, a hash code/meaning may specify that term #299 signifies a visitor using Internet Explorer 6.0. If hash code(s)/meaning(s) from data 204 is/are not present, client 201 sends a query 205 to network 202; network 202 responds by sending translation 206 to client 201. Translation 206 provides client 201 with the meaning of terms. In one embodiment, client 201 stores this meaning in cache 209 for future use.

Once client 201 has received sufficient data to generate a report, it sends report to display 207 for output to the user. In one embodiment, if some meanings have not yet been received, client 201 still sends report, and report states that certain terms are unknown. In another embodiment, client 201 displays an error message and/or waits until more complete meaning data is available.

The user can interact with the displayed report via user input device 210 such as a mouse, keyboard, or the like. The user can click on areas within report. When the user activates the compare mode, the user interface adjusts accordingly, e.g., as described in conjunction with FIG. 3C. When the user clicks on an area that can be interpreted as a filter, client 201 generates and sends a new query 203 containing the new report filter criteria. The above process then repeats, and an updated report is sent to display 207.

Referring now to FIG. 2B, there is shown an example of an architecture for network 202 according to one embodiment. Network 202 includes any number of front-end web servers 250 that receive queries 203, 205 from client 201, and any number of back-end servers 260 that obtain data from storage, e.g., from database 270, analyze the obtained data, and send report data back to client 201. Servers 250, 260 are computers or devices that send and receive information using well known network protocols, such as TCP/IP and HTTP, for communication across a network. Back-end servers 260 send an appropriate data set to client 201 based on the filter request and/or baseline data provided. For example, if a filter request specifies that the user is only interested in visitors that used a particular web browser, back-end servers 260 remove the data that does not match the specified criterion, and only forward to client 201 the data that does match.

Database 270 may be a relational database or any other type of database that stores the data used by client 201. Database 270 may be accessible by client 201 through a user interface, e.g., as described in conjunction with FIGS. 3A-3D.

Database 270 contains website visitation data, which in one embodiment is stored in a binary format stored in some storage medium such as a hard drive. In one embodiment, the website visitation data is broken up into files, or "bricks," to facilitate extraction of portions of the data. When servers 260 extract data from database 270, they are provided with specific bricks that match the criteria.

In one embodiment, when the user requests a report showing website visitation data for a specified time period, back-end servers 260 extract data from database 270 that contains web visitation logs and/or statistics. In one embodiment, servers 260 obtain data from database 270 that represents a snapshot of website visitation over a specified time period. Servers 260 then store this website visitation data in temporary local storage (such as random access memory), using for example a binary format that is encoded according to an algorithm so as to minimize bandwidth usage. In one embodiment, this binary format is identical to the format used in database 270, so that no file format translation need be performed when servers 260 extract data from database 270. Servers 260 and then apply filters as requested, and send the filtered data to client 201.

In one embodiment, whenever the user requests a broader date range for website visitation data, back-end servers 260 perform a new data extraction from database 270. However, when the user narrows the date range from a previously specified range, or uses a baseline already retrieved, no new data extraction is performed; rather back-end servers 260 filter the previously extracted data according to the new filter parameters.

Figure 2C:
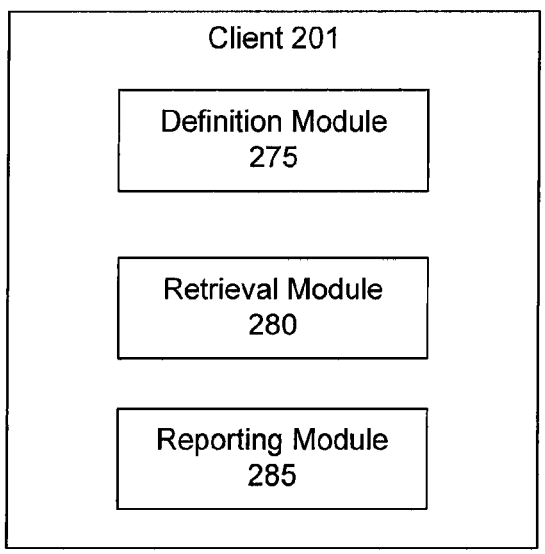
FIG. 2C is a block diagram illustrating software modules used by a client according to one embodiment of the present invention.

FIG. 2C is a block diagram illustrating software modules used by a client according to one embodiment of the present invention. The modules include of a number of executable code portions and data files. These include code for creating and supporting a user interface according to one embodiment of the present invention, as well as for supporting a comparison of website visitation data sets. The modules include a definition module 275, an input module 280, a retrieval module 285, a calculation module 290, and a reporting module 295.

The definition module 275 is configured for receiving and interpreting input to compare website visitation data sets. In one embodiment, the definition module 275 interprets that the user clicked on a compare mode button. In addition, the definition module 275 may register that segmentation and/or date filters were applied to the data, or that input was received to define one or more website visitation data set(s). In another embodiment, the definition module 275 interprets user input switching the baseline filter data and non-baseline filter data.

In one embodiment, the definition module 275, prior to receiving user input to compare data sets, receives user input to select one or more reports for viewing. For example, the definition module 275 registers a user click on a user interface control such as a reports button.

The retrieval module 280 is configured for retrieval of data associated with the newly applied baseline and/or filter(s). In one embodiment report queries and baseline information are sent to a network, and report data is received from the network. In another embodiment, report queries and baseline information are sent to a local machine, and report data is received from the local machine.

The retrieval module 280 also interprets the data received according to one embodiment. In one embodiment, the retrieval module 280 uses hash codes/meanings stored for this purpose. If hash codes/meanings are not present, for example in local cache, in one embodiment the retrieval module 280 sends a query to the network, and receives back translation, providing the meaning of term.

Further, the retrieval module 280 calculates the difference between the baseline data and newly-entered data for at least one website visitation metric. In one embodiment, the calculation includes subtraction and calculation of percent change between the data sets.

The reporting module 285 is configured for displaying one or more reports. In some embodiments, various views of the report data are available. In one embodiment, the reporting module 285 causes reports, original or adjusted for baselines and/or filters, to display virtually instantaneously following user input. In one embodiment, the reporting module 285 sends reports to a display device for output to the user.

The above software portions 275-285 need not be discrete software modules. The software configuration shown is meant only by way of example; other configurations are contemplated by and within the scope of the present invention.

User Interface

FIG. 3A illustrates a user interface 305 for comparing website visitation data according to one embodiment of the present invention. In one embodiment, the user interface is implemented using a known environment such as Macromedia Flex, Java, DHTML, or any combination thereof.

The user interface 305 includes two main functional areas: a report control area 310 and a report display area 315. The report control area 310 includes functionality creating, filtering, and comparing reports. The report display area 315 includes functionality for displaying and filtering reports.

The report control area 310 further includes a project toolbar 320, a report selection area 325, a segment filter area 330, and a date filter area 335 according to one embodiment.

The project toolbar 320 is a toolbar that includes icons for creating a new project, opening an existing project, saving the project in use, printing the project, selecting compare mode, etc. For example, the project toolbar 320 includes a compare mode button 340 as described below according to one embodiment.

The report selection area 325 includes functionality for opening existing reports. Once a report is opened, the report name is added to a list of selected reports in the report selection area 325, and a corresponding report 360 is displayed in the report display area 315. For example, FIG. 3A depicts a products and customer loyalty reports 360. The segment filter area 330 includes functionality for adding and displaying a list of segmentation criteria by which reports 360 are filtered. In the example shown in FIG. 3A, no filters have been applied.

The date filter area 335 includes functionality for filtering reports 360 by date, for example by selecting a date range for which the user would like to see report 360 data. The date filter area 335 includes to and from date selectors 370 and a show by selector 375 according to one embodiment. The to and from data selectors 370 allow the user to set start and end dates for the data displayed in the report 360, either by typing in the desired dates or by clicking the calendar icon and selecting the dates on a calendar. The show by selector 375 allows the user to select the granularity of the report, for example, by day, week, or month. For example, the date filter area 335 shown in FIG. 3A shows a to and from date selector 370 showing a date range of Mar. 1, 2006 to Apr. 9, 2006, and the show by selector 375 shows that the granularity is by day.

The project toolbar 320 includes a compare mode button 340, which when selected, puts the report control area 310 into compare mode, thus altering the appearance of the report control area 310. In one embodiment, the compare mode button 340 changes the report control area 310 to the form shown in FIG. 3C, discussed below.

Figure 3B:
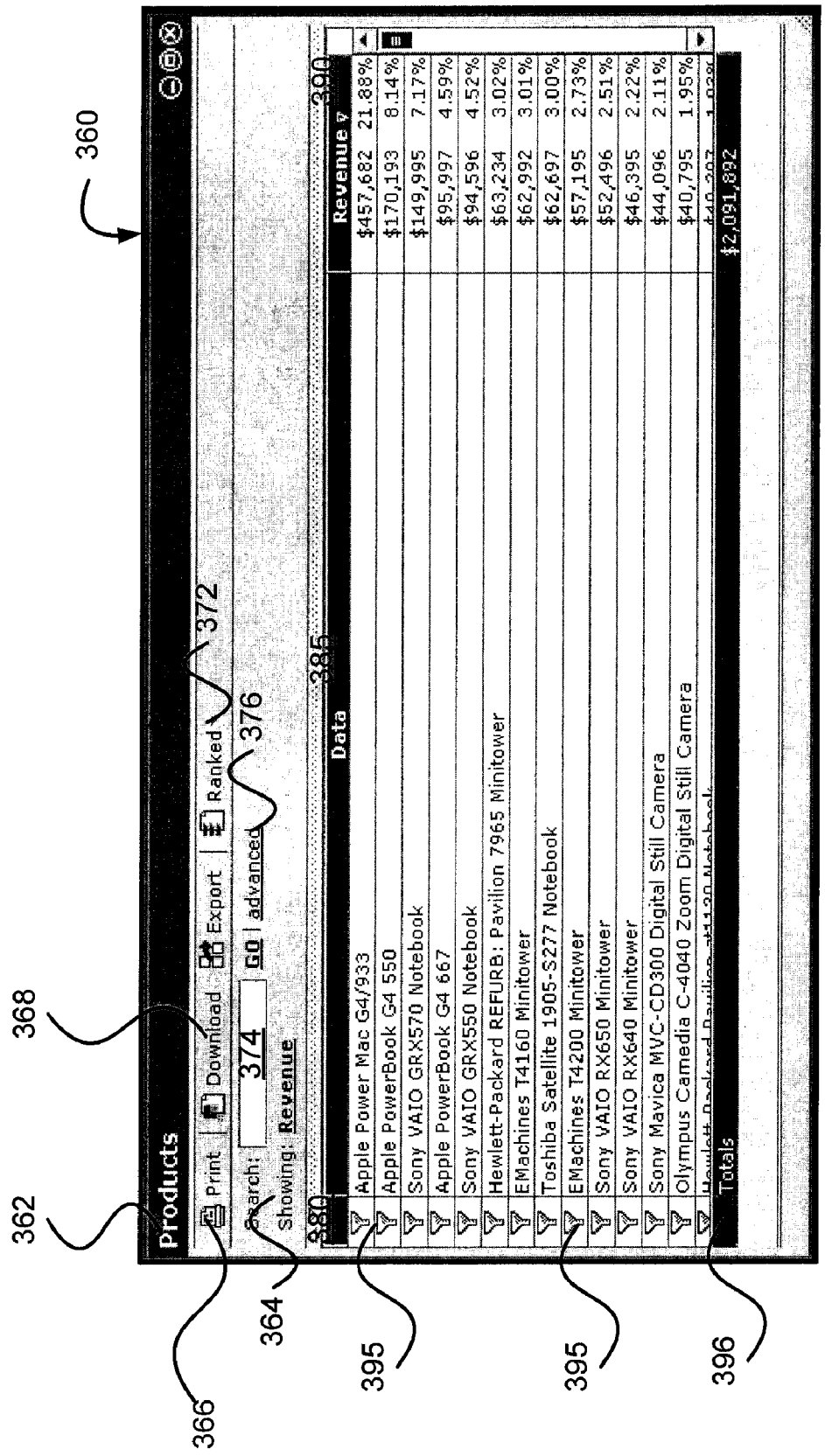
FIG. 3B illustrates a report without comparison data according to one embodiment of the present invention.

The report display area 315 includes the reports 360 chosen in the reports selection area 325. FIG. 3B illustrates a report 360 without comparison data according to one embodiment of the present invention. Each report 360 displays data corresponding to one dimension within the context of a larger data set. The report name 362 is the dimension that the selected report 360 displays. For each report 360, data is sorted according to one or more default metrics 364. In this example, the default metric 364 is revenue.

Reports 360 also include a set of standard function keys, including a print button 366, a download button 368, an export button 369, and view selector 372. The print button 366 allows the user to print online reports without having to first download the reports. Clicking the print button opens a pop-up window with a printer-friendly version of the report.

The download button 368 allows the user to select the format in which to download the report (e.g., Word, Excel, PDF, HTML). Once the user selects a format, the report is sent to the user as an email attachment or is downloaded directly to the user's computer. The export button 369 allows the user to export the report 360 to another format or file location.

The view selector 372 allows the user to select various views of the report data. The Ranked view, shown in FIG. 3B, is the default view for most reports, allowing the user to view report data in tabular format according to the selected time periods. Other views include Improved, which allows the user to see how selected items performed between previous and current time periods based on success metrics such as revenue of checkouts, and Trended, which allows the user to view report trends over a given time. The user may select other available views using the view selector 372 drop-down.

In addition, some reports 360 include a search field 374. A search field 374 allows the user to search for and view entries for specific keywords or phrases. As a result of clicking "go," the report displayed is filtered by the entered search term. In addition an advanced search button 376 allows the user to search with greater specificity, for example, by choosing whether to search for the exact phrase, perform an "and" or "or" search using the search terms, or exclude entries with the entered search terms. In one embodiment, clicking the advanced search button 376 opens a pop-up window displaying these options.

Each report 360 is divided into columns, including a filter column 380, a data column 385, and one or more metric columns 390. The data column 385 includes a list of various forms of the dimension corresponding to the report 360. In the depicted example, the dimension is Browsers, thus various browsers, such as Microsoft Internet Explorer 6.0, Netscape Navigator 6.2.3, etc., are listed. The metric column (s) 390 includes statistics for the respective row's 395 data column 385. In the example depicted, for each browser (data column 385), the metric column 390 displays visitors (to the website) and percentage of the whole.

The filter column 380 of each row 395 includes an icon that allows the user to filter the data by that row 395. In one embodiment, all reports 360 are filtered to reflect the filter. In one embodiment, the filter column 380 icon acts as a toggle, narrowing or expanding the data depending on the present state of the data. Data may be further filtered if desired, and again all reports 360 are filtered by the additional criterion. In one embodiment, the filtering occurs virtually instantaneously. In addition, the rows are totaled in a totals row 396.

Reports 360 display rows up to a pre-selected number for the user interface 305. In one embodiment, the number of rows can be edited. The user can interact with on-screen report windows according to well known interaction techniques for window-based operating systems. For example, the user can drag edges to change the height and width; minimize, delete, and maximize; reposition/rearrange windows on the canvas by dragging the window title bar; and drag the column margins to resize column width.

Figure 3C:
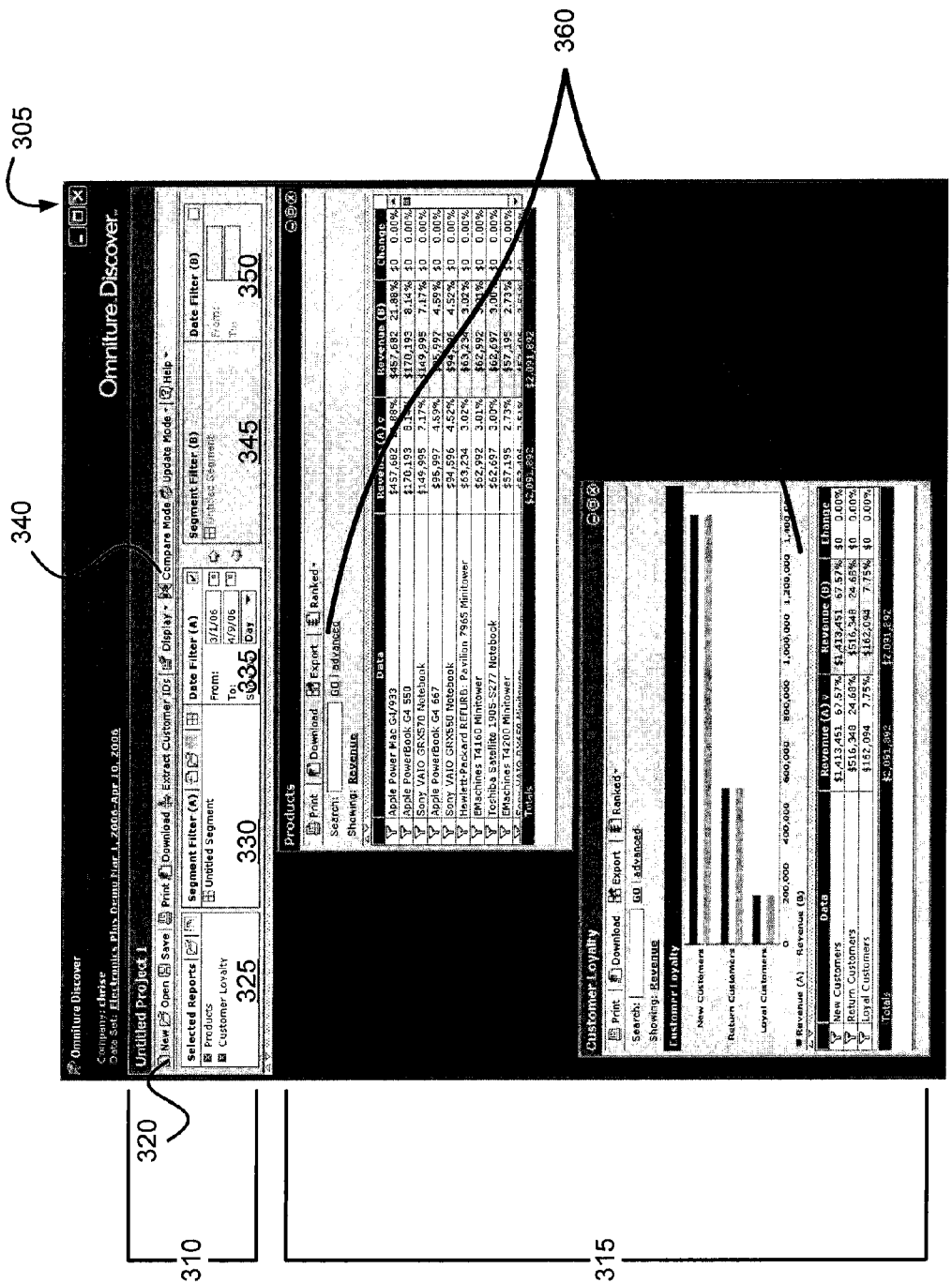
FIG. 3C illustrates a user interface for comparing website visitation data according to one embodiment of the present invention.

FIG. 3C illustrates a user interface 305 for comparing website visitation data according to one embodiment of the present invention. The user interface 305 shown in FIG. 3C is similar in structure and function to that described above in conjunction with FIG. 3A, except that the report control area 310 of FIG. 3C is shown in compare mode. Thus, in addition to including a project toolbar 320, a report selection area 325, a segment filter area 330, and a date filter area 335 as described above, a baseline segment filter area 345 and a baseline date filter area 350 are included.

The baseline segment filter area 345 is similar to, and works in conjunction with, the segment filter area 330. Together, the baseline segment filter area 345 and segment filter area 330 allow comparison of metrics common to the data sets represented by each filter area 330, 345. In one embodiment, the baseline segment filter area 345 provides the baseline data, or first data set, to which the segment filter area 330 data is compared, as shown in FIG. 3C. In this example, the data in the baseline segment filter area 345 is "locked" or otherwise not editable. In this example, the segment filter area 330 has a checkbox indicating whether it is available for editing according to one embodiment. In one embodiment, the baseline segment filter area 345 is grayed out or otherwise deemphasized, as depicted in the example shown in FIG. 3C.

In one embodiment, the baseline segment filter area 345 is populated using the data shown in the segment filter area 330 prior to switching into compare mode. In another embodiment, the baseline segment filter area 345 is not locked, and thus is editable. The baseline segment filter area 345 and segment filter area 330 may be used alone, or in conjunction with the baseline date filter area 350 and date filter area 335.

The baseline date filter area 350 is similar to, and works in conjunction with, the date filter area 335. The baseline date filter area 350 and date filter area 335 allow comparison of data at one point in time to another point in time. In one embodiment, the baseline date filter area 350 provides the baseline dates, to which the date filter area 335 data is compared. In this example, the date information in the baseline date filter area 350 is "locked" or otherwise not editable. In this example, the date filter area 350 has a checkbox indicating whether it is available for editing according to one embodiment. In one embodiment, the baseline date filter area 350 is grayed out or otherwise deemphasized, as depicted in the example shown in FIG. 3C.

Figure 5A:
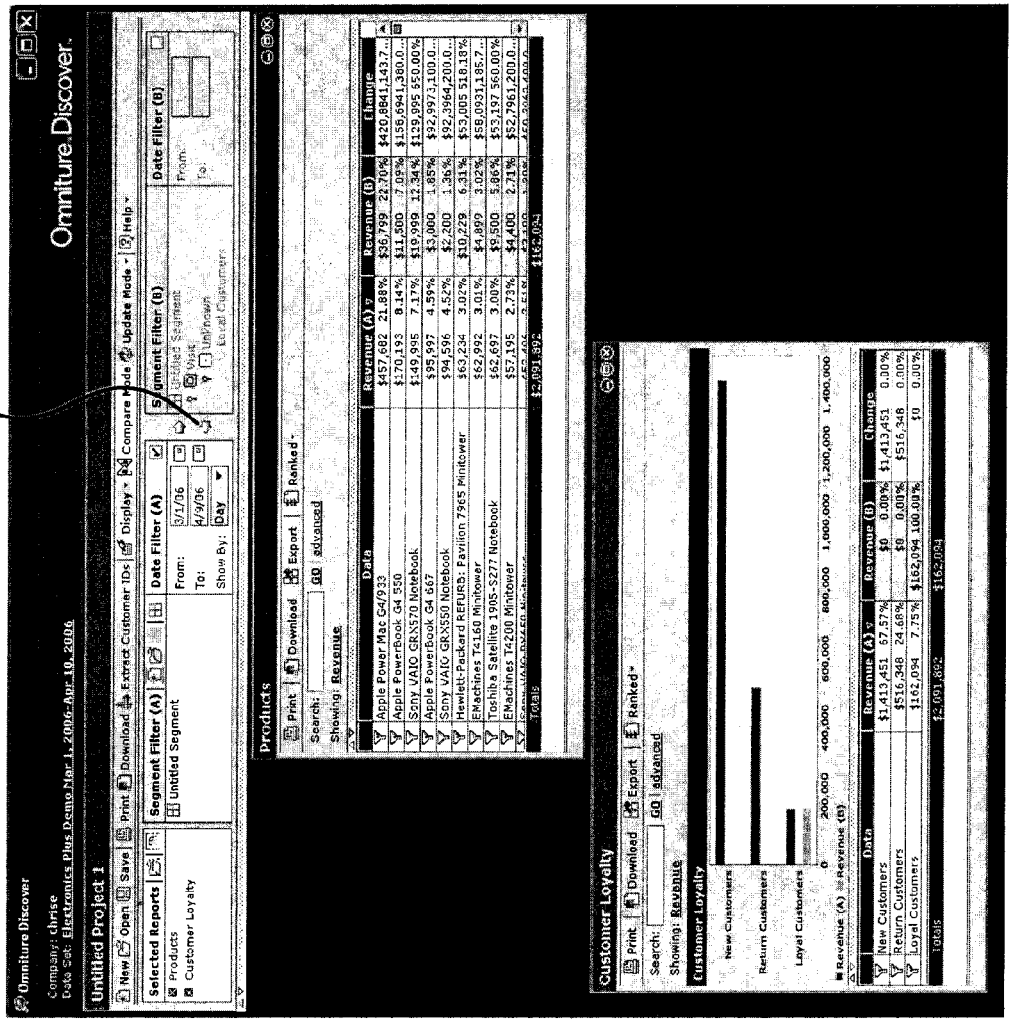
FIG. 5A illustrates a user interface for comparing website visitation data reflecting a swap between baseline and non-baseline data according to one embodiment of the present invention.

According to one embodiment, the baseline segment 345 and date 350 data can be swapped for the segment 330 and date 335 data, e.g., by the user clicking arrows 505 between the segment and date areas 330, 335 and the baseline areas 345, 350, as shown in FIG. 5A. FIG. 5A depicts the data after this swap has been made. In this example, the previous segment data 330, 335, filtered to loyal customers, has become the baseline data 345, 350. The new baseline data can then be compared against, e.g., using newly input data.

Referring again to FIG. 3C, in one embodiment the baseline date filter area 350 is populated using a report 360 displayed in the report display area 315. In another embodiment, the baseline date filter area 350 is populated using the data shown in the date filter area 335 prior to switching into compare mode. In another embodiment, the baseline date filter area 350 is not locked, and thus is editable. The baseline date filter area 350 and date filter area 335 may be used alone, or in conjunction with the baseline segment filter area 345 and segment filter area 330.

Figure 3D:
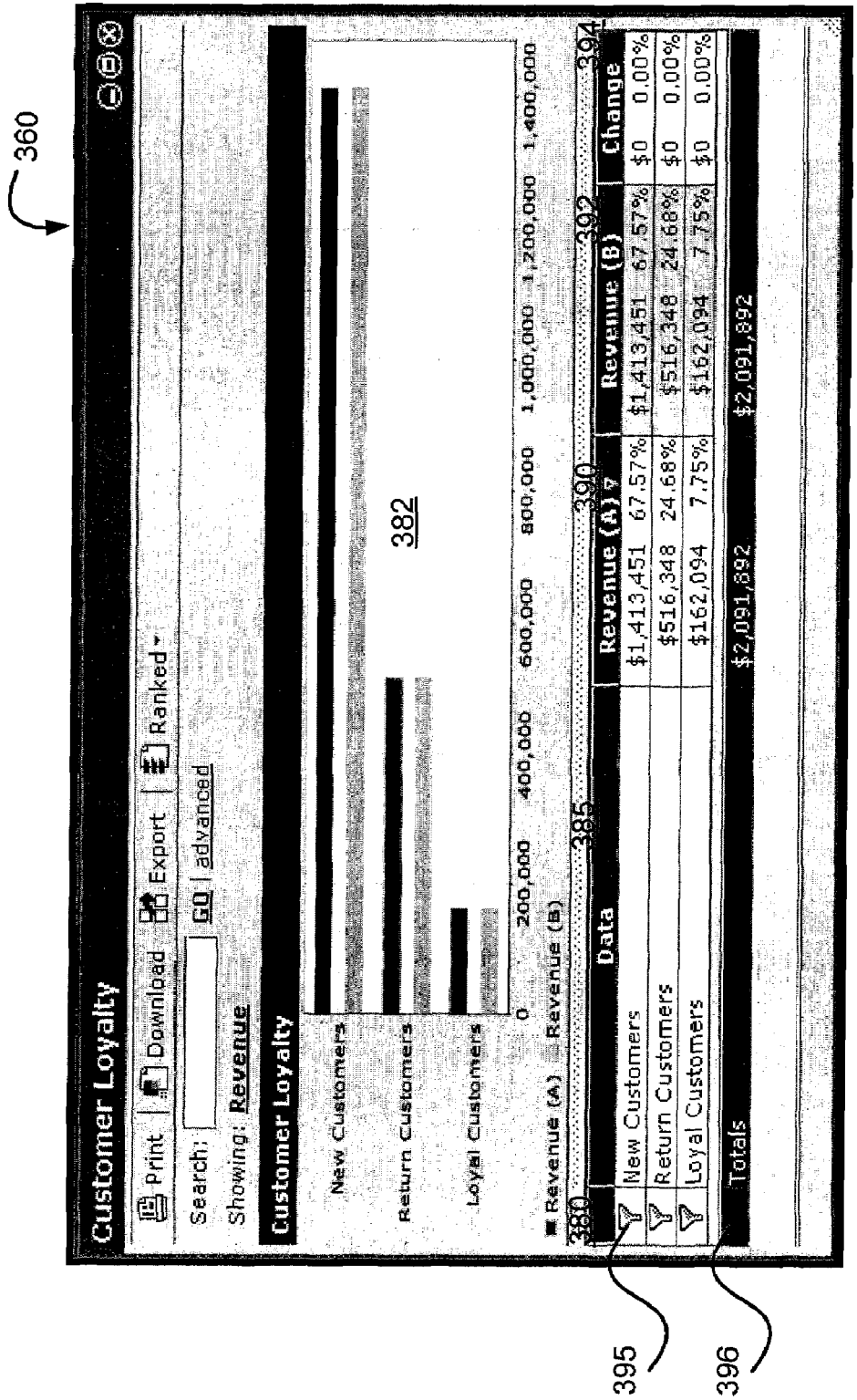
FIG. 3D illustrates a report including comparison data according to one embodiment of the present invention.

The report display area 315 of FIG. 3C also is shown in compare mode. FIG. 3D illustrates a report 360 including comparison data according to one embodiment of the present invention. Each report 360 displays data corresponding to one dimension within the context of a larger data set. In addition to the aspects described in conjunction with FIG. 3B, the report 360 of FIG. 3D includes one or more baseline metric columns 392, a change column 394, and may include a comparison area 382.

The baseline metric column(s) 392, like metric columns 390, include statistics, e.g., revenue by dollars and as a percentage of the whole. In one embodiment, the baseline metric column 392 displays data from the baseline segment and date filter areas 345, 350 and the metric column 390 displays data from the segment and date filter areas 330, 335. In this example, the baseline metric column 392 provides the baseline data against which the data from the metric column 390 is compared. The report 360 in FIG. 3D is shown immediately after selecting compare mode, so the baseline metric 392 and metric columns 390 are identical.

The change column 394 indicates the difference between the baseline metric column 392 and the metric column 390 for at least one website visitation metric. In one embodiment, the calculated difference is shown both as a numeric value (e.g., dollars as shown in FIG. 3D) and percent change. The difference shown in the change column 394 of FIG. 3D is zero, as the figure illustrates a report 360 immediately after selecting compare mode.

The comparison area 382 displays a visual depiction of comparison data from the baseline date filter 350 and date filter areas 335 and/or the baseline segment filter 345 and segment filter areas 330. In one embodiment, the comparison area 382 visual depiction comprises a bar graph, as shown in FIG. 3D. In some embodiments, the baseline segment and/or date filter data is visually distinguished from the segment filter and/or date filter data, e.g., using colors or otherwise distinguishing the two data sets. In some embodiments, the comparison area 382 displays a portion of the comparison data, for example, the top five statistics from the data 385 column. This aspect of the invention allows for a side-by-side data comparison in a visual format. In one embodiment, the comparison area 382 is configured such that more than two sets of data can be compared. For example, the baseline segment data and/or segment data may include more than one set of data.

Figure 4A:
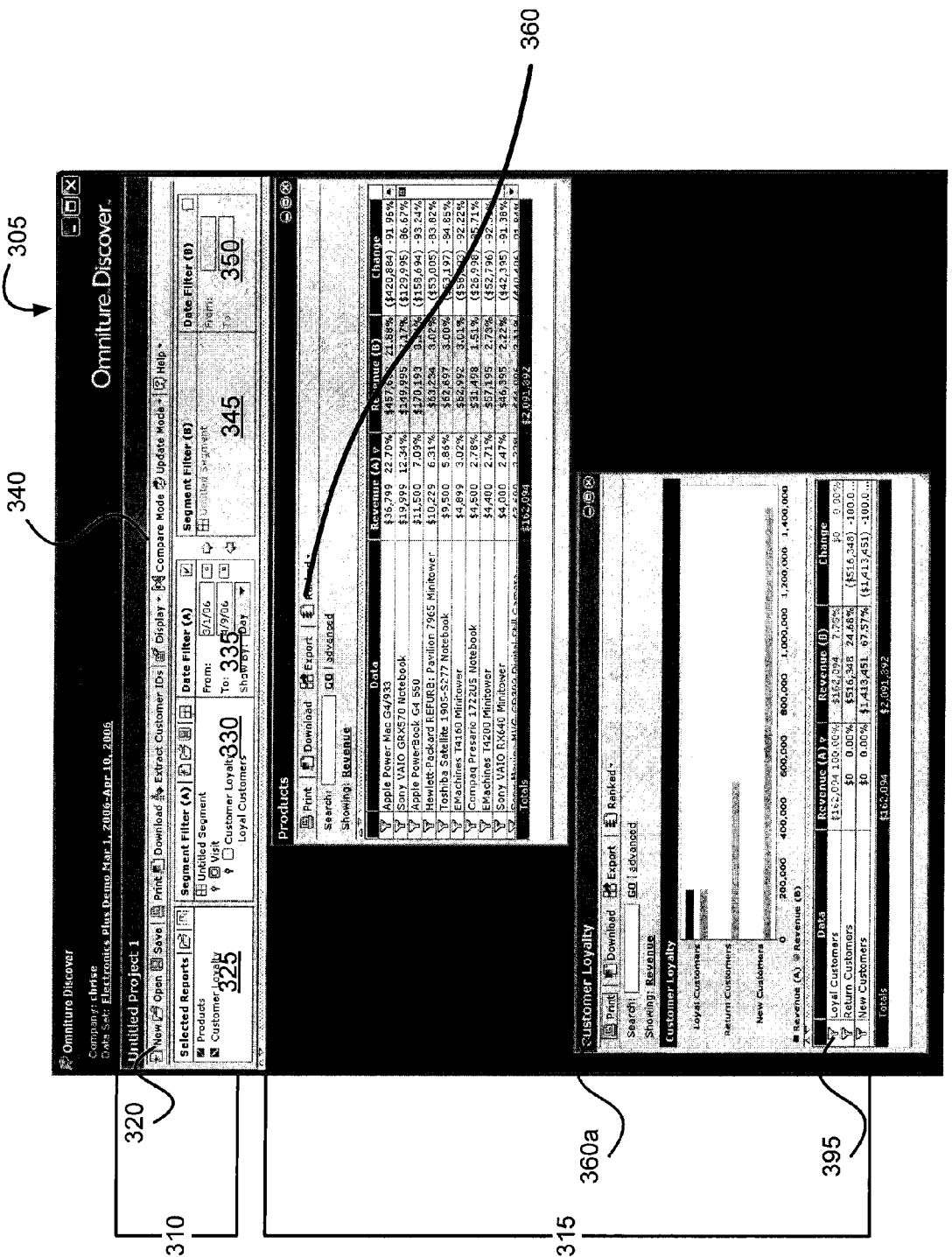
FIG. 4A illustrates a user interface for comparing website visitation data to which a filter has been applied according to one embodiment of the present invention.

Similar to FIG. 3B, in the report 360 shown in FIG. 3D, the filter column 380 of each row 395 includes an icon that allows the user to filter the data by that row 395. FIG. 4A shows the user interface 305 after a filter has been applied.

The user interface 305 shown in FIG. 4A illustrates the state of the reports 360 after the filter in the filter column 380 for loyal customers 395a has been applied. The segment filter area 330 reflects this segment being added as a filter, as shown in FIG. 4A. In addition, both reports 360 have been filtered by this segment according to one embodiment. The customer loyalty report 360a filtered by loyal customers is shown in greater detail in FIG. 4B.

Figure 4B:
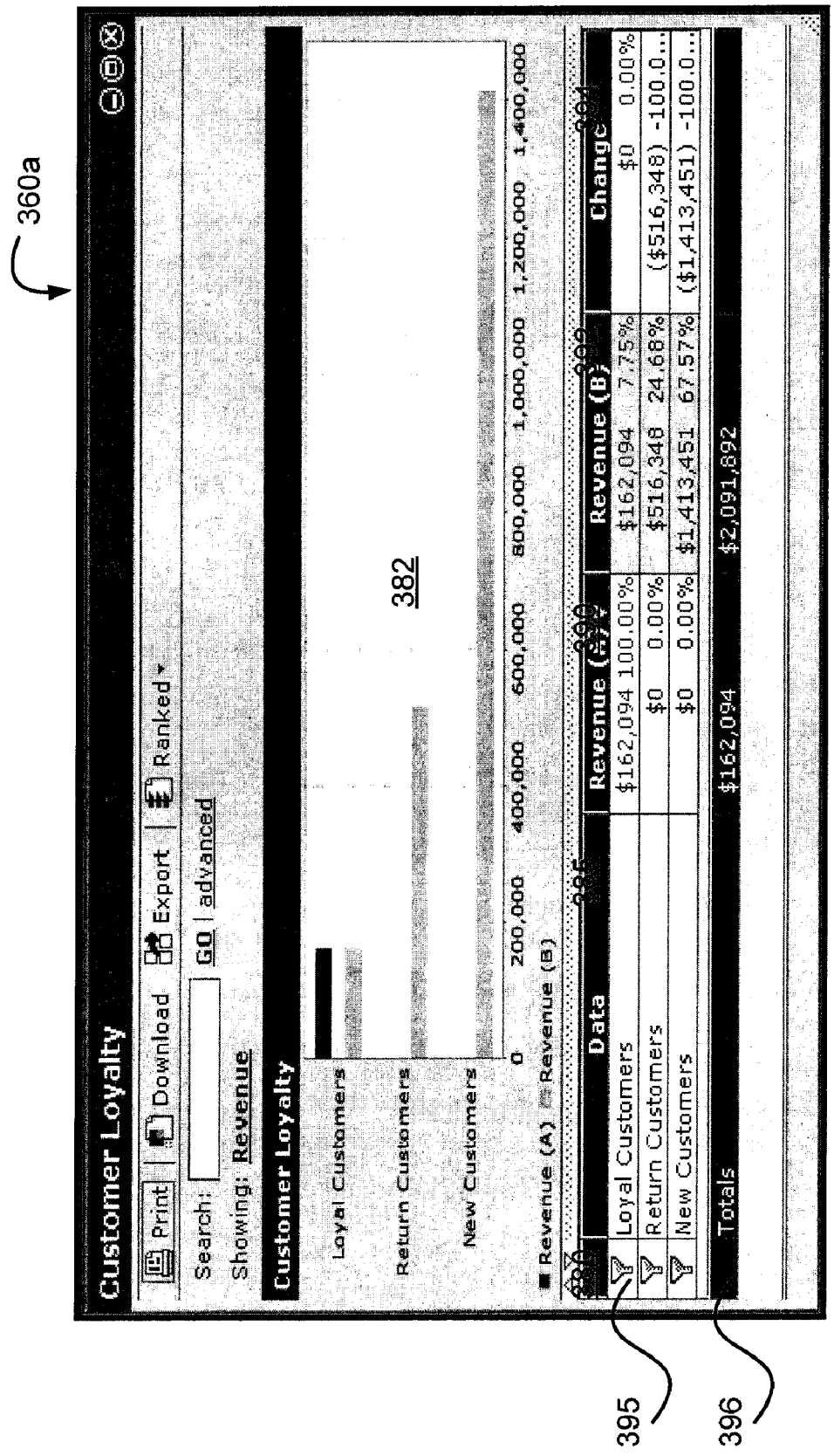
FIG. 4B illustrates a report including comparison data to which a filter has been applied according to one embodiment of the present invention.

In the example shown in FIG. 4B, the data in the baseline metric column 392 is unchanged from FIG. 3D. The metric column 390 has been filtered on loyal customers 395a, thus one-hundred percent of revenue in the segment is attributable to loyal customers, and the return customer and new customer rows have been zeroed out. The change column 394 and totals row 396 reflect these differences. In addition, the comparison area 382 shows data from the metric column 390 for loyal customers 395a only.

Figure 5B:
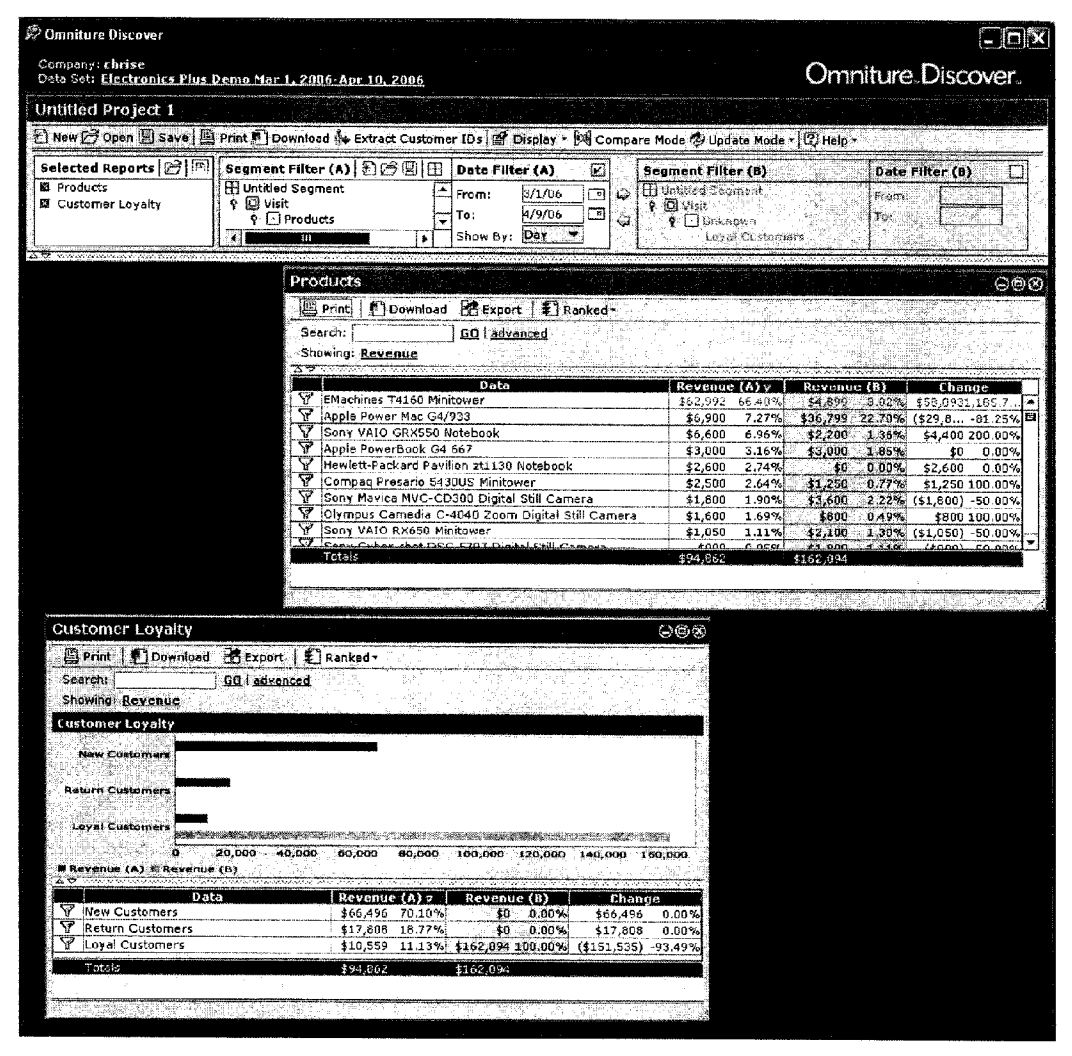

In any of the above-described interfaces 305, segment and date filters can be added thereto and/or removed there from. FIG. 5B shows an example of an additional segment filter, a filter on the EMachines T4160 Minitower product, applied to the interface of FIG. 5A.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may include a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for providing a comparison of website visitation data sets, comprising:
   receiving user input to compare a first set of website visitation data to a second set of website visitation data, the first set of website visitation data and the second set of website visitation data both describing navigation between web pages, wherein the first and second sets comprise a plurality of criteria, the plurality of criteria comprising a plurality of website visitation metrics, wherein said first and second data sets of visitation data are generated from using a first and second navigation tool, respectively;
   receiving user input to define the second set;
   retrieving data corresponding to the second set;
   calculating, for at least one website visitation metric, a difference between values of the website visitation metric for the first and second data sets; and
   displaying a report comprising the calculated difference.

2. The method of claim 1, wherein the first set of website visitation data is determined by a displayed report showing the first set of website visitation data.

3. The method of claim 1, wherein the first set of website visitation data serves as baseline data for comparison with the second set of website visitation data.

4. The method of claim 1, wherein the first set of website visitation data is editable.

5. The method of claim 1, wherein the first set of website visitation data is locked.

6. The method of claim 1, wherein receiving user input to compare a first set of website visitation data to a second set of website visitation data comprises receiving input selecting a compare mode button.

7. The method of claim 1, wherein the first set of website visitation data comprises a first of the plurality of criteria and the second set of website visitation data comprises a second of the plurality of criteria.

8. The method of claim 1, wherein the first set of website visitation data comprises a first set of date criteria and the second set of website visitation date comprises a second set of date criteria.

9. The method of claim 1, wherein the first set of website visitation data comprises a first of the plurality of criteria and a first set of date criteria and the second set of website visitation data comprises a second of the plurality of criteria and a second set of date criteria.

10. The method of claim 1, wherein the first set of website visitation data comprises a first element of the plurality of criteria and a second element of the plurality of criteria and the second set of website visitation data comprises a third element of the plurality of criteria.

11. The method of claim 1, wherein the difference between the values of the website visitation metric for the first and second data sets is calculated using subtraction.

12. The method of claim 1, wherein the report comprises a graphical comparison area.

13. The method of claim 1, wherein the report comprises columnar data displaying the difference.

14. The method of claim 1, further comprising:
   receiving user input to adjust criteria for the report; and
   displaying one or more adjusted reports, each adjusted according to the adjusted criteria.

15. The method of claim 1, wherein retrieving data further comprises:
   sending one or more report queries to a network; and
   receiving report data from the network corresponding to the one or more report queries.

16. The method of claim 15, further comprising:
   in response to receiving report data, interpreting the data using a look up table.

17. The method of claim 1, wherein displaying the report occurs virtually instantaneous with receiving user input to compare a first set of website visitation data to a second set of website visitation data.

18. A computer-implemented method for providing a comparison of website visitation data sets, comprising:
   receiving user input to compare a first set of website visitation data to a second set of website visitation data, the first set of website visitation data and the second set of website visitation data both describing navigation between web pages, wherein the first and second sets comprise a plurality of criteria, the plurality of criteria comprising a plurality of website visitation metrics, wherein said first and second data sets of visitation data are generated from using a first and second navigation tool, respectively;
   receiving user input to define the second set;
   retrieving data corresponding to the second set;
   calculating, for at least one website visitation metric, a difference between values of the website visitation metric for the first and second data sets; and
   displaying a report comprising the first set of website visitation data, the second set of website visitation data, and the calculated difference.

19. The method of claim 18, wherein the report comprises columnar data displaying the first set data, the second set data, and the calculated difference.

20. A system for providing a comparison of website visitation data sets, comprising:
   a definition module configured for receiving user input to compare a first set of website visitation data to a second set of website visitation data, the first set of website visitation data and the second set of website visitation data both describing navigation between web pages, wherein the first and second sets comprise a plurality of criteria, the plurality of criteria comprising a plurality of website visitation metrics, further configured for receiving user input to define the second set, wherein said first and second data sets of visitation data are generated from using a first and second navigation tool, respectively;
   a retrieval module configured for retrieving data corresponding to the second set and calculating, for at least one website visitation metric, a difference between values of the website visitation metric for the first and second data sets; and a reporting module configured for displaying a report comprising the calculated difference.

21. The system of claim 20, wherein the first set of website visitation data serves as baseline data for comparison with the second set of website visitation data.

22. The system of claim 20, wherein the definition module is further configured for receiving input selecting a compare mode button.

23. The system of claim 20, wherein the retrieval module is configured for using subtraction to calculate the difference between values of the website visitation metric for the first and second data sets.

24. The system of claim 20, wherein the definition module is further configured for receiving user input to adjust criteria for the report and displaying one or more adjusted reports, each adjusted according to the adjusted criteria.

25. The system of claim 20, wherein the retrieval module is further configured for sending one or more report queries to a network and receiving report data from the network corresponding to the one or more report queries.

26. The system of claim 20, wherein the retrieval module is further configured for interpreting report data received using a look up table.

27. The system of claim 20, wherein the reporting module is further configured for displaying the report virtually instantaneous with receiving user input to compare a first set of website visitation data to a second set of website visitation data.

28. A system for providing a comparison of website visitation data sets, comprising:

a means for receiving user input to compare a first set of website visitation data to a second set of website visitation data, the first set of website visitation data and the second set of website visitation data both describing navigation between web pages, wherein the first and second sets comprise a plurality of criteria, the plurality of criteria comprising a plurality of website visitation metrics, wherein said first and second data sets of visitation data are generated from using a first and second navigation tool, respectively;

a means for receiving user input to define the second set;

a means for retrieving data corresponding to the second set;

a means for calculating, for at least one website visitation metric, a difference between values of the website visitation metric for the first and second data sets; and a means for displaying a report comprising the calculated difference.

29. A computer readable memory storing a computer program executable by a processor, the computer program producing a user interface for displaying website visitation data, the user interface comprising:

a report control area configured for receiving user input to compare a first set of website visitation data to a second set of website visitation data, the first set of website visitation data and the second set of website visitation data both describing navigation between web pages, wherein the first and second sets comprise a plurality of criteria, the plurality of criteria comprising a plurality of website visitation metrics, and configured for receiving user input to define the second set, wherein said first and second data sets of visitation data are generated from using a first and second navigation tool, respectively;

a executable process for retrieving data corresponding to the second set and for calculating, for at least one website visitation metric, a difference between values of the website visitation metric for the first and second data sets; and a report display area for displaying a report comprising the calculated difference.

30. The computer program product of claim 29, wherein the first set of website visitation data is editable.

* * * * *

UNITED STATES PATENT AND TRADEMARK OFFICE
CERTIFICATE OF CORRECTION

| | |
|---|---|
| PATENT NO. | : 7,383,334 B2 |
| APPLICATION NO. | : 11/458306 |
| DATED | : June 3, 2008 |
| INVENTOR(S) | : Catherine Jen Wong, Christopher Reid Error and Brett Michael Error |

It is certified that error appears in the above-identified patent and that said Letters Patent is hereby corrected as shown below:

Page 2, on the Title Page Item (56), under the "Other Publications" section, please insert the missing reference:

-- HONG, J. et al., "What Did They Do? Understanding Clickstreams with the WebQuilt Visualization System," WebQuilt homepage http://guir.berkeley.edu/projects/webquilt/, pp. 1-7. --

Signed and Sealed this

Twenty-third Day of September, 2008

JON W. DUDAS
*Director of the United States Patent and Trademark Office*